US 7,636,874 B2

(12) United States Patent
Gutbrod et al.

(10) Patent No.: US 7,636,874 B2
(45) Date of Patent: Dec. 22, 2009

(54) METHOD AND APPARATUS FOR COMPUTER-IMPLEMENTED PROCESSING OF PAYMENT ENTRIES

(75) Inventors: Roger Gutbrod, Sandhausen (DE); Rolf W. Haas, Schramberg (DE); Hans-Dieter Scheuermann, Birkenau (DE); Martin Walter Schroter, Bad Schoenborn (DE)

(73) Assignee: SAP AG, Walldorf (DE)

( * ) Notice: Subject to any disclaimer, the term of this patent is extended or adjusted under 35 U.S.C. 154(b) by 772 days.

(21) Appl. No.: 10/846,570

(22) Filed: May 17, 2004

(65) Prior Publication Data
US 2005/0004850 A1 Jan. 6, 2005

Related U.S. Application Data

(63) Continuation of application No. PCT/EP02/12923, filed on Nov. 18, 2002, now abandoned.

(60) Provisional application No. 60/331,470, filed on Nov. 16, 2001.

(51) Int. Cl.
G06F 11/00 (2006.01)

(52) U.S. Cl. .............................. 714/48; 714/2; 235/379; 705/40

(58) Field of Classification Search ................... 714/48, 714/2
See application file for complete search history.

(56) References Cited

U.S. PATENT DOCUMENTS

| 4,694,397 | A | * | 9/1987 | Grant et al. .................... 705/42 |
| 5,384,449 | A | * | 1/1995 | Peirce ......................... 235/380 |
| 5,984,178 | A | * | 11/1999 | Gill et al. ..................... 235/379 |
| 6,032,184 | A | * | 2/2000 | Cogger et al. ............... 709/223 |
| 6,138,107 | A | * | 10/2000 | Elgamal ....................... 705/39 |
| 6,185,545 | B1 | * | 2/2001 | Resnick et al. ................ 705/40 |
| 7,020,254 | B2 | * | 3/2006 | Phillips .................. 379/114.04 |
| 2002/0073290 | A1 | * | 6/2002 | Litvin ......................... 711/170 |
| 2002/0143614 | A1 | * | 10/2002 | MacLean et al. .............. 705/14 |

* cited by examiner

Primary Examiner—Emerson C Puente
(74) Attorney, Agent, or Firm—Kenyon & Kenyon LLP

(57) ABSTRACT

Method and apparatus for the computer-implemented processing of payment entries which are intended to move money in an account, wherein a payment entry is automatically checked for errors as it is received and if at least one error occurs an error sequence is decided upon from a list of error routines by means of an error routine, all the errors occurring in a given payment entry being supplied collectively to the error routine, and within the scope of the error routine the errors which have occurred are weighted and appropriate error follow-up measures are initiated depending on the results of the error weighting.

14 Claims, 5 Drawing Sheets

METHOD AND APPARATUS FOR COMPUTER-IMPLEMENTED PROCESSING OF PAYMENT ENTRIES

CROSS REFERENCE TO RELATED APPLICATIONS

This application is a continuation of International Application No. PCT/EP02/12923, filed Nov. 18, 2002 now abandoned, which claims the benefit under 35 U.S.C. § 119(e) of U.S. Provisional Application No. 60/331,470, filed Nov. 16, 2001, all of which are hereby incorporated herein by reference.

BACKGROUND OF THE INVENTION

Currently, banks operate in their application landscapes with a number of product-or savings-specific systems. The running of these is cost intensive and cannot be scaled up. Accordingly, there is a need in the art for a system and method that simplifies running processes and substantial product savings neutrality within the scope of the banking business, for example.

SUMMARY OF THE INVENTION

The present invention relates to a method and an apparatus for the computer-implemented processing of payment entries which is intended to move money in an account.

According to an embodiment of the invention, a payment entry is automatically checked for errors and if at least one error occurs an error sequence, i.e. a reaction to the error which has occurred, is carried out by means of an error routine (Posting Control Rules). According to the embodiment, all the errors occurring in a giving payment entry are supplied collectively to the error routine in order to weight the errors which have occurred and initiate appropriate error follow-up measures depending on the results of the error weighting. This procedure is based on the finding that many of the errors which possibly occur in connection with a payment entry can be dealt with automatically, and with a weighted procedure the time spent dealing with errors is significantly reduced. In particular, in the case of a mixture of errors occurring some of which can be dealt with fully automatically while others have to be dealt with by human decisions, depending on the composition of the errors or types of errors, an economical process can be automatically initiated in which, for example, first the mechanically processable errors are dealt with before the procedure is handed over to an operator, or there is no initial mechanical processing as the error to be dealt with by the operator is so serious that it does not appear worthwhile to deal with other errors before remedying this one.

According to an embodiment, an operator is presented with a display, e.g. on a workstation monitor screen, based on the results of the error weighting in the individual case. The display is arranged so as to include the data needed to process a given error. According to the invention this significantly reduces the time spent by a qualified operative on dealing with the error as all the information needed for dealing with the error is provided directly or through a link.

According to an embodiment of the invention, the payment entry in which an error has occurred is automatically postponed for a given period of time and examined again after this time has elapsed.

The invention clearly also extends to computer programmes with programme coding means which are suitable for carrying out a method according to the invention when the computer programme is run on a computer, and computer-readable data carrying media with computer programmes according to the invention stored thereon and to computer programme products with computer-readable data carrying media of this kind.

Further features and embodiments of the invention will become apparent from the description and the accompanying drawings.

It will be understood that the features mentioned above and those to be described hereinafter may be used not only in the particular combination given but also in other combinations or on their own without departing from the scope of the present invention.

BRIEF DESCRIPTION OF THE DRAWINGS

The invention is schematically illustrated by means of an embodiment shown in the drawings and is hereinafter described in detail with reference to the drawings.

DETAILED DESCRIPTION

Figure 1:
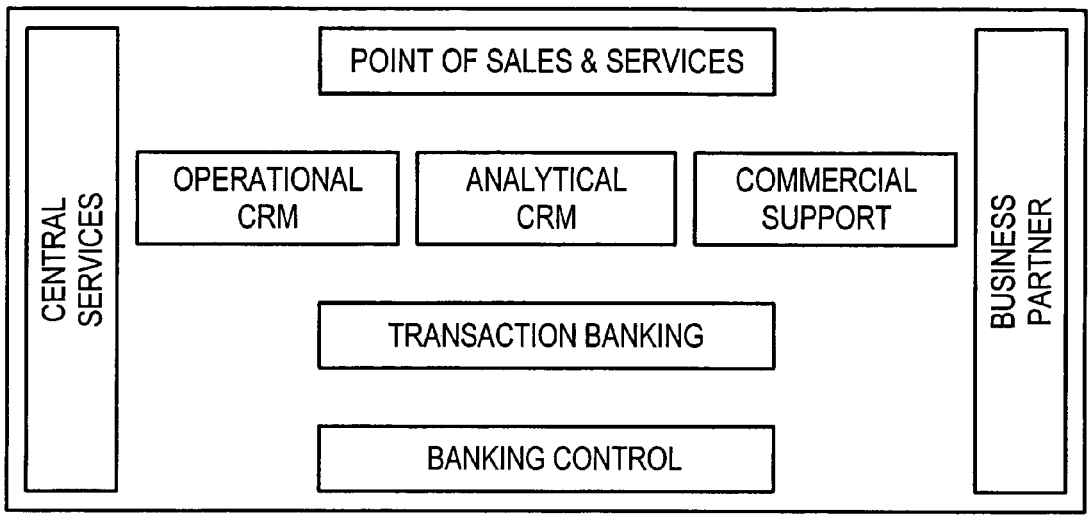
FIG. 1 is a block diagram of a target application landscape according to the invention.

First of all, the technical environment of the invention will be described.

The results of detailed analysis of the market, in collaboration with international banks and consultancies, are reflected in the current software solutions used by the applicant and further development projects. On the basis of this collaboration in recent years a target application landscape for banks has been developed which is based on the needs of the international finance markets. The individual applications of this software architecture constitute solutions and integral parts of solutions of the so-called e-business solution mySAP Banking. Essentially, mySAP Banking can be divided into the areas of core banking, SEM for banks and CRM for banks.

Applications are information systems which solve a primary problem of operational economics and which can be implemented per se. They contain the data and functions to solve the primary problem, i.e. they combine activities which are closely related in subject matter. An application communicates through defined interfaces. As a rule an application is a marketable solution. Examples are Product Account Management, Profit Analyser and Risk Analyser.

In the following embodiments applications are divided into core applications and accessory applications:

Core applications are the main applications of the application landscape. Accessory applications are supplementary applications which widen the scope of function of core applications (including more than one). They perform special tasks (examples include limit determination and scoring models) and have their own investment cycle independent of the core applications. This ensures greater flexibility in adaptation to changing political targets in business.

The application landscape of the e-business solution mySAP banking describes the essential applications needed to operate the banking business. The applications are connected according to operational economic logic.

"Technical Architecture" describes the linkage between applications by a middleware. "Application Architecture" describes the business management content of individual applications and the logical interplay of individual parts of an application. These parts are known as components.

The applications of SAP are constructed according to a shell model: In the nucleus is the solution for the international use of the software and as a supplement to this country-specific solutions are provided. Individual customer supplements may be added on in another shell based on BTEs (Business Transaction Events) or BADIs (business Add-Ins) or the use of BAPIs (Business Application Programming Interfaces).

Financial Institutions and Banks Make the Following demands of Applications:
  Customer-centred and distribution method—neutral support for the sales/service processes.
  Fast reaction to system demands for the development of new products.
  Possibility of integrating new business processes.
  Product division—neutral development of contracts and unified stock control.
  Integration and consistency of internal and external billing.

The Following Demands are Made of the Application Landscape:
  Flexible modernisation of the application landscape for years to come (depending on the investment cycle of the applications).
  Fast reaction to changing business models (e.g. Outsourcing, Insourcing).
  Client-specific expansion possibilities without modifying the standard solution.
  Support for different migration scenarios.
  Flexible integration into existing application landscapes in banks.
  Reduction in the interface complexity by integrated processing within the SAP application landscape.

The Result of This, for the Application Landscape Sought:
  The individual applications are interchangeable and expandable. In particular, individual applications should not be too extensive. In an integrated system landscape of the SAP individual applications must be able to be deactivated and foreign applications must be able to be integrated.
  The bank decides by the choice of applications on the desired extent of standard functions.
  Each application must be capable of being expanded so that integration in client-specific application landscapes can be developed by the SAP, by certified partners or by the clients themselves.

Clear Competence of Applications

If we look at central bank processes, various tasks and information requirements can be derived. These different requirements conflict with one another to some extent and form an obstacle to the optimum construction of individual solutions. Thus, a client-centred processing is the demand for distribution and service organisation in a solution. The cost-reducing developing of contracts and accounts, on the other hand, is contract oriented. Internal and external billing in turn aligns the processes with legal and organisational conditions.

Applications communicate through public interfaces. No direct access is allowed to applications. This ensures that data exchange can take place transparently between applications. Within an application a consistent database is guaranteed. Unexpected risks caused by unknown linkages and access can be minimised. This communication structure allows direct data exchange between applications through public interfaces or indirect data exchange through public interfaces and business management middleware. For example, the Posting Control Office can communicate with the account management through public interfaces; however, the data exchange may also take place via middleware with its own business intelligence.

Middleware is a central element for implementing an application landscape. Middleware can perform two functions:
  Technical communication (services)
  Business management control (Business Rules)

There are various solutions on the market for technical communications, this allows the exchange of information between different data banks in different formats.

Business management control of business cases demands a regulating mechanism. This is defined as the Business Rule. Process knowledge which covers the application is necessary in order to implement the Business Rules.

Elements of the Business Rules are process objects which initiate the call up of business objects in the individual applications. Examples include "contract arrangement": this refers for example to the business objects of business partner, contract and card product. The imaging of front ends and back ends using Middleware is a widespread practice. However, it is also necessary to back up back end processes between applications, something which is not well established. Therefore, for reinvestments in these fields it is essential to have a clear concept of process control.

This construction also allows stepwise migration with successive opening up of new applications.

For SAP the interplay of applications and Middleware has a strategic significance and is currently being actively promoted. Within the scope of the analysis of technical feasibility the question of performance plays an important role.

The structure of the target application landscape shows "key functional areas" with which the bank management solution fields can be imaged. Within one such area there may be a number of applications. The area which contains applications that banks require in order to carry out their secondary processes, such as for example personal finance, systems accounting, material management, etc, is not shown.

The basis for this structure is the goal of defining areas of application on a high level which serves a specific main purpose. In this way it is possible to derive applications and define clear competencies. Redundant applications and functions can be avoided. The landscape of the following main functions is well known:
  Applications for client-centred performance of sales and service processes.
  Applications for carrying out and monitoring trade processes.
  Applications for contract-centred high performance working.
  Applications for legally and organisationally induced data calculation and preparation for bank control.

Applications for the central preparation of data which supports the other areas to an optimum degree without being redundant.

FIG. 1 is a diagrammatic view of a block diagram showing a target application landscape for account management according to the invention.

In the top level of the block diagram in FIG. 1, in the box "Point of Sales and Services" is the customer interface to the sales and service department of the bank, such as the call centre in telephone banking or a subsidiary branch.

In the second level of the block diagram under "CRM" are stored data relating to the client, operational data being data regarding existing customers, analytical data being data on the acquisition of new customers.

Finally, in the third level of the block diagram, under transaction banking, are shown contracts with clients. These contracts relate to accounts, borrowing, securities, payment transactions, deposits, etc.

In the bottom fourth level is the bank control.

Every bank communicates with the markets and requires interfaces for this purpose. As a rule, value-added business and business transactions are generated from this interface. It is of central importance for a bank as it also represents its image. Obviously, these interfaces are numerous. The following may be mentioned as essential interfaces:

Personalised two way communication: Branches, call centres, processing offices and dealing rooms. At these interfaces documents and other rule confirmation of the results of communication are necessary. This form of communication is generally very staff and cost intensive.

Personalised one way communication: SB-terminals, internet, telephone. Here, a party takes action by inputting data and receives a system generated result. In this case the bank is represented not by its employees but by the system reaction.

System operated two way communication: electronic dealing systems, clearing systems, payment handling systems, market data input, data exchange with information bureaux, notifications to supervisory authorities. Here, the bank employees only take manual action in the event of a fault.

Whereas in the handling of payments system-operated data exchange has been continuously worked on in recent decades, in terms of customer care there was an innovative breakthrough only with the advent of direct banking. This breakthrough was accelerated by the internet and, after retail business (online banking) now encompasses wholesale business (e.g. accreditive processing) and dealing (e.g. increases in issues; increase in electronic trading places).

These new interfaces have to be integrated into the existing IT landscape of a bank. Therefore, it makes sense to uncouple the distribution channels and encapsulate them so that it is possible to adapt to the rapidly changing trends. This rapid reaction time can only be achieved if as little business management logic as possible is contained in the front ends and is located in an application area which is "distribution route-neutral".

The front ends are supposed to encompass all the client-initiated business. Only in this way is it possible to make use of synergies and process optimisation of a modem software solution. Moreover, the organisational decision to leave certain business transactions to be done directly by the customer can be put into practice more easily (e.g. the now common use of ATM terminals or internet or mobile phones for giving payment instructions, ordering foreign currency, etc).

Between the forms of communication there is a network. Thus, for example, telephone users can be connected to a call centre by the click of a button if they experience problems in inputting data. Against this background it is all the more important to maintain data through all distribution pathways at a uniform status so that all employees are informed as to the activities and history of the client.

Customer Relationship Management (CRM) encompasses the whole range of analysis, activities and documentation in the field of client contact. Thus, not only are sales processes and the associated marketing relevant but also services throughout the period of the contract. CRM is more than a databank with marketing data for SAP. It includes operative processes with corresponding data management. Many functions are present in redundant form for each channel in market solutions of this kind. The goal of SAP within the scope of CRM applications is to achieve immediate availability of business and distribution functions independently of the distribution channel.

In operational CRM the following processes can be defined:

Distribution processes (sales processes) are focused on the acquisition of new business, on the one hand from the client base and on the other by attracting new customers. Depending on the business field (retail/wholesale), the product (payment transactions/active or passive business or business on commission) or customer group this process has different degrees of complexity, risk and yield.

Service processes include customer care during the life-cycle of the contract. The main points include: the desire to block cards, changes of address, complaints.

For mapping the processes described above the following client-centred solutions which are distribution route-neutral are needed in this range of applications:

Contract management supports the drawing up of the request and offer and the conclusion of the contract including correspondence and electronic files. Contract management shows the contractual agreements between the bank and client, in customer-centred manner. The contracts may have any desired degree of complexity. For example a credit agreement secured by life insurance and security in the form of a guarantee may be mentioned. If the contract data are called up, they contain a selection of information relevant to processing supplemented by distribution and service-oriented data. These contracts may be processed by means of a number of applications, i.e. the relationships between individual contracts or partial contracts are documented throughout their entire life. Customer-centred sales and service processes are "anchored" in the contracts of the contract management.

Important processes:

Concluding and documenting the contractual and pre-contractual customer agreements.

Monitoring the content and dates of contractual and pre-contractual terms and events (e.g. conditions for payment; lack of legitimation; extension deadlines).

In product management market related configuration of products takes place. This process is carried out in accordance with the processing area of a bank. The preparation of products in this field of application is concentrated on the market presentation of these products, i.e. on the varying forms which a customer can choose. The product must support mass business in the retail business and guarantee a unified product portfolio and hence contractual portfolio. The degrees of freedom of individual products are generally limited (e.g. as a rule the only variable parameters of a savings bonds are the nominal amount and its term). By contrast with the retail business the wholesale business has high degrees of freedom within the product as the contractual agreements must allow for highly individual forms.

Important services:
Configuration of the product parameters
Product calculation

Activity and contact management makes it possible to detect, monitor and control activities with the customer. Moreover, all contacts with the customer are documented and can be evaluated according to various features. The bank has a "virtual" customer representative who is available through all the distribution channels. For example, a complaint made through the call centre is also visible to the employees at the branch. This ensures a uniform status of information for all the employees who come into contact with the customer. The customer activities on the internet are also to be integrated into the contact management.

The application area "Analytical CRM" includes the processes of analysis for using business and customer potential and converting them into operational use (e.g. marketing measures).

Analysis processes form an essential aspect of an efficient customer relationship management. These include processes such as, for example, cost information for controlling service, marketing and sales actions, customer-specific characteristics for determining further customer potential, information on competitors' products, etc. The primary functions of analytical CRM are:

Customer segmenting and profiling
Campaign Management
Database Marketing

Corresponding solutions support the bank in planning and carrying out marketing measures, begun in the segmenting and profiling of customer bases up to the planning, carrying out and monitoring of marketing campaigns.

CRM is of strategic importance according to the invention for offering total solution competence.

Applications for supporting trading activities are characterised by high product specialisation. Special know how and short investment cycles are the marks of these solutions. To some extent the existing systems still imitate the back office processes. A clear cut makes it possible to process handling and billing processes in cost-decreasing manner. Trading systems often have rudimentary risk monitoring. Banks are increasingly being required to provide the instruments of control of the overall bank control directly in value added manner in the trade area.

Important processes in this area are:
Product configuration for trading
Contract management for trading
Limit management for trading (exposure management).

According to the invention it is not a trading system that is provided but rather the trade activities are monitored.

In the field of transaction banking the starting position is as follows: globalisation of the banking market expresses among other things the intention of market participants to have efficient operating magnitudes. In order to make full use of the effects of scaling and specialisation in recent years a partly internal and partly overarching separation of distribution and transaction banks has developed. Outsourcing solutions are one example of how the transaction bank has succeeded as a business model in its own right. However, while maintaining the running within their own businesses attempts are made to optimise the running of customer business by automation and centralisation.

Currently, banks operate in their application landscapes with a number of product-or savings-specific systems. The running of these is cost intensive and cannot be scaled up. Simplifying running processes and substantial product savings neutrality within the scope of the banking business are major requirements in this field. The configuration of handling processes is supposed to be accelerated and made more flexible by product configuration. The possibility of expanding the software is of crucial importance in this field of business particularly taking account the long investment cycle of 15-20 years.

For the SAP this field of application provides a major strategic contribution to optimising the process in the international banking world. The field of transaction banking has the essential components of payment transactions, account management (handling and stock control), securities settlement and deposit administration (handling and stock control).

Account management has the task of running the legal position in the matter of cash flow, i.e. it provides information as to the requirements and obligations of the bank to third parties. The stock control of account management is the source of bank statements and notifications of balance. The balances and turnover entries are clear of currency, i.e. unconverted. The status is the basis for the external billing, i.e. the contractual and turnover data held here from the database for drawing up the balance.

In account management there is also the handling of (partial) contracts. Partial contracts because a customer contract can be divided up into a number of handling applications owing to its complexity. For example, in operational CRM, a product may consist of a "salary account with credit card and travel insurance". Whereas the salary account is managed in account management, the handling of the card is carried out by a provider and the travel insurance by a partner. The handling functionality means that automated extensions or contractual billings are carried out. This means for the operational CRM that it must obtain the up to date state of the account from the management.

In account management only legally valid contracts are managed, i.e. simulation business, offers and requests are outside, in operational CRM.

Payment transaction systems are conventionally country-specific solutions. The payment transaction system takes on the formal checking and if necessary the consolidation and distribution of turnover within the routes and formats used by the bank (internal and external routing).

Payment transaction systems conventionally work by the so called batch method. As a supplement, payment instructions must also be given in dialogue form to initiate immediate real time accounting in account management (additional application in payment transactions). Between payment transaction systems and account management a high performance communication must be provided.

Fundamentally, within the scope of the present invention, the management and execution of long term instructions is an additional application in payment transactions (payment instructions and long standing instructions fall within account management). However, it is also possible to carry them out as an additional component within account management (e.g. payment transfer within account management).

The field of transaction banking contains, in addition to the solutions described above for the money side, solutions for security business and derived financial transactions. Thus, it can be assumed that as a rule there are a number of stock control systems in this field. In the management of securities (securities settlement "management of deposits") there is the peculiarity that within the scope of the customer business this is a stock control which is not on the balance sheet.

The business partner solution is a central application for storing and managing all customer information. This solution is very closely linked to the solutions for operational and analytical CRM. Because of the process linking the business partner is serviced within the scope of these processes. The business partner data constitute an important immaterial asset for every bank the value of which is determined by the quality of the data.

The business partner application combines the customer data of a bank in a manner which transcends the application. The most important data are:
Name and address of the business partner
Additional data depending on the type of business partner (e.g. date of birth; legal status) for all fields of application (e.g. branch key for marketing selection or communications)
Relationships (e.g. borrower unit; concern structures)
Roles
Legitimation data
Creditworthiness data/data from credit reference agencies/ scoring results/marketing cluster
Data of budgetary account or balance sheet analysis
Total debts
Links between business partners may be connected with one another in many ways. Functions are provided for forming borrower and risk units.

Customers go to a bank in defined roles (e.g. account holders, borrowers, guarantors). For this reason the business partner application includes the role of a customer as an important component.

The application range "central services" contains solutions which support the banking business of the other areas.
Security management
Output and input management/correspondence
Market data, data of origin of securities, information services
Administrative services: authorisations, organisational units The administration of securities is of particular importance as a result of the Basle Decisions on risk exposure. By differential allocation of securities a bank can optimise its own capital position and thus reduce its credit cost. Moreover, knowledge of securities and their value is one way of acquiring new business. Recording securities is generally done during the initiation and conclusion of a contract and is initiated from the operational CRM. The clearing of securities is carried out in the course of winding up a contract.

The management of securities includes on the one hand securities which the bank receives and on the other hand securities which the bank itself provides. This second aspect is not currently available on the market in virtually any solution. However, activities of a bank in the derivative field also require documentation and control of securities which they themselves set up.

Management of securities is an important component of the overall solution.

The application of output management/outgoing correspondence constitutes a solution for optimum communication with the customer. Various media are used such as the postal services, fax or e-mail. There may be some dependencies between the media. Statutory notification periods must also be observed (e.g. written notice of the closing of an account).

In addition to the choice of output media a high functionality is needed for controlling and preparing paper correspondence. The key words here are central printing; forms and rationalised postage.

The invention assists the correspondence-oriented data selection and preparation. Further processing in a printing and despatch line is carried out by special suppliers.

The function "electronic file" belongs to input management/incoming correspondence, as does the general linking of documents to the objects of contract, business partner, etc. Input management has become a central service in operational CRM.

This relates to solutions which provide information on a number of applications within a bank.

The services referred to as "administrative services" serve to organise the running of the banking business.

The existing system landscapes have grown up historically in most banks. The operational systems play a central role and deliver downstream systems, often with pre-calculated results. These frequently produce different results and a complicated process of transmission and adaptation. It is no longer possible to make decision within a short space of time. The control of a bank is therefore required to have a single source for the database and consistency of methods through all the evaluation processes. In order to achieve the goal of matching the data and methods, the systems of a bank must be organised differently from hitherto. In particular, a clear distinction must be drawn between the operating systems and the applications of the overall bank control. This freeze the operating systems from the downstream processes of the overall bank control and at the same time centralises the processes. The data required by the operating systems are made available at a data interface.

The bank control relates not only to individual institutions but to entire concerns. Precisely for control throughout the concern, unity and transparency of methods and their presentation are of great benefit.

The following fields are integrated in an overall bank control according to the invention:
Balancing of accounts
Profitability/controlling
Active/passive controlling
Risk controlling
  Market risk/internal models
  Credit/loss of address risk
  Contractor risk
  Country risk
Communications
Limit management (analytical)
Transaction banking has the following central tasks:
Controlling the trade in money and securities
Handling the contractual position
Turnover management and running of the legal position in terms of money and securities The scope of the solution of transaction banking will be described hereinafter.

In order to embed the functionality of transaction banking in the overall context of the application landscape we will first discuss the following aspects:
Processing options
Data management
Product configuration and financial conditions Processing Options As an application in its own right transaction banking needs to be able to be processed directly. The reasons for this may be:
Disposition and limit management on the quality control of the position.
Dealing with complaints, such as correcting fees.

Stock control processes, such as for example the processing and agreeing of CpD accounts.

Making corrections on the basis of incorrect or inadequate data input (e.g. value corrections, accounting corrections)

Traditionally, account management is referred to as an add-on to customer care. The invention is designed so that implementation of the account manager is possible. This role comprises the following two fields of work:

On the one hand, they are activities which act directly outwards to the customer (e.g. lowering of limits) and on the other hand activities which affect only the portfolio "without customer contact" (e.g. CpD processing, data correction).

Primarily, distinctions are drawn between two types of processing layers in transaction banking:

Basic Maintenance Interface (BMI)

Handling Office (Account Management Office/AMO)

The Basic Maintenance Interface is an interface for processing individual functions.

This interface allows manual intervention into otherwise largely automated transactions. All functions from this area therefore have an interface. A clearing process guarantees properly revised processing. A clearing tool which is tied into the individual applications in the system is suitable for this.

This interface is made available as standard and the correcting profiles for these work spaces can be defined by the user as roles, so that each user is provided with a menu which precisely satisfies his requirements as to the system.

These interfaces do not take account of any customer-organisational processes or improved running.

The Handling Office (Account Management Office/AMO) guarantees process controlled, i.e. workflow-aided processing of business incidents. Within the office there are different role-based functions. The control is assisted by adjustments to the SAP workflow in accordance with individual customers and associated clearing processes (4 to 8-eye principles). Compared with the basic maintenance interfaces these offices have their own data management (e.g. disposition orders). Access to functions and data for processing the business incidents, extending beyond the application, is crucial to tying in the office. Moreover, the results of the office activities should be transmitted to the central contact management so as to allow a fully client-centred view right through the bank.

In management today there are frequently processes which do not belong in this category (e.g. opening up an agreement by post).

Market studies have additionally shown that the aim of banks is to slim numerous back office processes by 70-80% purely by shifting them onto the customer, as is already done by internet banking (e.g. opening up an agreement). Management is only at its most efficient when the customer of the bank can himself initiate business such as for example blocking a card or can arrange for payment instructions.

Guiding Data Management

In every application landscape there can only be one "master" for the data to which other applications apply directly or obtain periodic updates.

The master for the partial agreements which are to be handled is in the account management, i.e. the appropriate contractual data and conditions are deposited there.

The same is true of turnovers and balances. Therefore, on this basis, data is prepared for the bank statements and for a data warehouse.

The extent to which applications have to hold redundant data is determined largely by the performance requirements and depends on the individual customer's situation.

Product Configuration and Financial Conditions

Product Configuration

As shown in the target application landscape, product configuration is a central theme in a modern solution looking towards the future. Product configuration comprises three essential aspects:

Product configuration in the operational CRM. Here, product configuration is oriented according to the requirements of marketing and sales.

The formation of the handling product with all the control parameters relevant to this handling within transaction banking/account management. A product presented to the market can be divided into a number of partial products for handling.

The configuration of products for bank control. These products generally have a different granularity from the handling products. Data management is also aligned with the needs of evaluation and not the requirements of handling.

In the three main processes of banking the product is differently emphasised, with the exception of one area: "the financial condition of the product". For this reason the financial conditions are additionally shown.

Finally, the product configuration extends over all three fields of application. Overall coordination between the fields of application is essential within the framework of the implementation of a new product. The products are promoted in each area per se:

In transaction banking the product promotion takes place through customising. Authorisation and clearing are ensured by means of the transporting methods of SAP.

The connection between operational CRM and transaction banking is obtained by making a specific contract with a client through a public interface (BAPI). The following are given at the interface:

the customer the product ID and the individual terms of the contract.

The product ID provides the connection with the (partial) handling product.

Financial Conditions

The financial conditions are the basis for calculating interest and fees. They are therefore particularly important and must be available in every field of application. Access is critical to performance within the scope of stock control. In order to guarantee that the conditions remain consistent beyond the limits of individual fields of application, SAP makes the financial conditions of account management available to all other applications through BAPIs.

Figure 2:
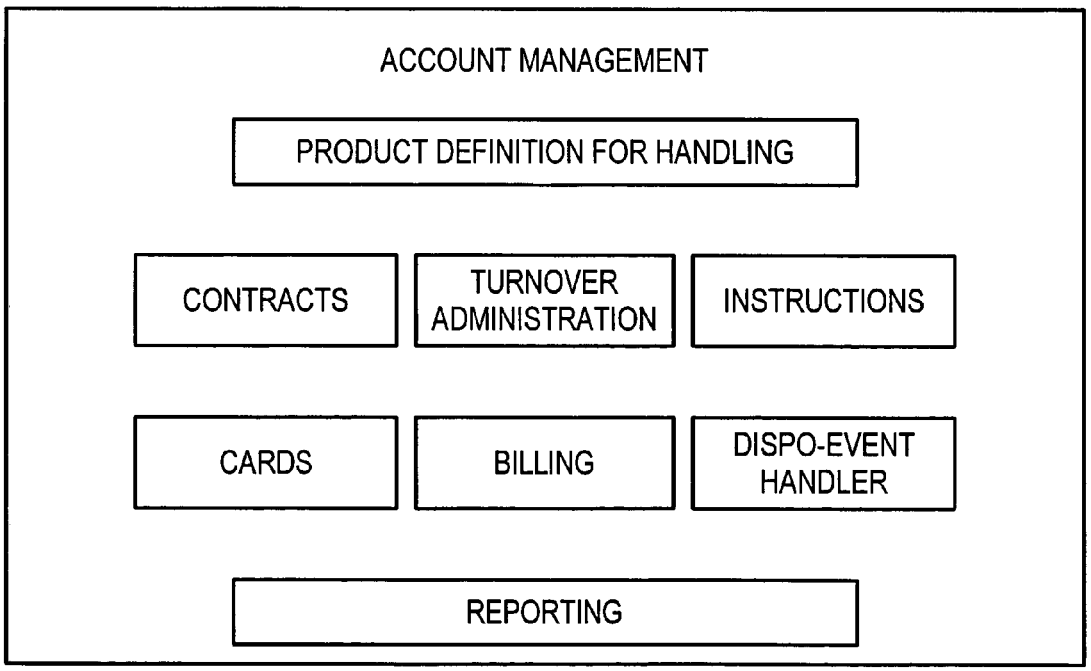
FIG. 2 also shows, in the form of a block diagram, the components of the account management according to the invention.

FIG. 2 illustrated by means of a block diagram the components of account management. Account management has a product savings-neutral structure. First of all payment transaction products and services as well as passive and active products of retail banking are in the focus of development.

The contractual component is designed as a framework. It is therefore possible to use it as a central service for all applications of the target application landscape.

It is conceivable that the contract and its framework may in future be used as the central service for all applications of the target application landscape.

The contract manages all the basic data relevant to handling in the account management by means of contractual components. Contracts use products as their basic ingredient. The contract is directed to the highest possible performance in running mass business.

Freed-up contracts are generally passed on to the contract management from the previous systems through an interface BAPI. However, during the life of the contract it can be expected that there will be direct access to the contract from transaction banking and data will be changed. Particular contracts such as, for example, contracts for CpD accounts are placed directly in account management. The contract recognises the freed-up and non-freed up state.

For all contractual data there can only be one "master" in an application landscape. This "master" is in account management for the handling data. Moreover, contracts are substantially managed automatically. That means that in this case the current state of the contract is known (e.g. after extensions). The contractual data are made available at interfaces.

As an explanation we should point out that there are of course contractual data which are managed in other applications and run as "master" (e.g. security identifications, authorisation of access). The central anchor for combining all the data is in the operational CRM.

Important processes in account management are:I Investing, altering, extending, terminating, cancelling and dissolving contracts. These also affect the corresponding accounts. Two features of contracts are supported:

Account agreements

Card agreements (see below)

It will be understood that it is also possible to support other parties to the agreements.

Turnover Administration

The essential added value of account management lies in producing and handling movement data. The solution must be high performing and incur little cost. Other requirements of the solution are real time processing and availability 7×24 hours.

The turnover administration logs the individual turnovers in real time and controls a flexible updating of the account. The movements are monitored on the account. Individual transactions are payment entries (half sentences) which are based on the one hand on payment instructions and on the other hand on internal accounting (e.g. payment of interest). Additionally it is possible to calculate and process cash flows. Account management has an interface for receiving payment entries (BAPI).

Turnover administration does not recognise any open posting administration with corresponding balancing of individual posts. It is possible to monitor payments on the basis of the balance, which, for example, controls the input of funds in the course of a fixed money system or the payment of instalments in the case of credits.

Incoming payment entries are checked within the material arrangement for barriers and limits. A regulating mechanism (posting control rules) flexibly controls the reaction of the system by means of given parameters. Thus, for example, it is possible to determine, specifically for customer groups, whether a turnover is to be disposed of later or transmitted directly.

System reactions are:

Accounting, letter procurement, subsequent processing, return, refusal, CpD accounting.

The individual turnover is also the basis for the ledger handover. The data are also used for producing bank statements. The updating of transactions is clear of any currency and non- evaluated.

Orders or instructions describe the actions which the account management is to perform immediately or in the future. This means that instructions can be monitored in a watching file: These instructions may alter one or more objects.

Account management processes instructions. Examples are "dissolving contracts" and "setting limits". These instructions are initiated from outside through interfaces or internally by the application itself (e.g. watching deadlines for card renewals).

Other additional functions envisaged are central applications such as long term administration of instructions and payment orders (cf the preceding remarks).

The card solution uses these same components of product configurator, contract and financial conditions as the account management. Thus, the administration of cards is a specialisation of the general contract. It is necessary to integrate card administration into account management as there are close links between cards and accounts (e.g. EC card, debit card). In particular, SAP want to keep the option of handling credit card accounts in the medium term at the turnover end.

Card administration must constitute a solution which can optionally be used by the customer, i.e. card administration must be capable of being switched off within the account management. Moreover, the card administration should be capable of being dismantled in the medium term to such an extent that it can be used as an individual solution if there is a corresponding demand in the market. According to present experience, there is a need for an account management system including and excluding card administration. Hitherto there have not been any enquiries for card administration on its own.

Account management has a central administration for periodic work (e.g. processing at the end of the day). The bank gets maximum flexibility when planning the jobs. Covered under periodic working are the functions which have to be carried out repeatedly at a certain date. These include the closing down work of cash concentration, closure of accounts, interest compensation, bank statements, processing instructions, daily closure including updating the books and reporting. Before the closing work is carried out a cut off point is provided in the booking. After that, all bookings carry the next days date.

External systems for job control can also be tied in.

The Posting Lock Manager (lock administration) is responsible for temporary accounting locks, i.e. he imposes barriers which are initiated by business events (posting lock events) and releases these barriers after the event in question has passed. Barriers which are defined a priori on the product are not included in this component.

Figure 3:
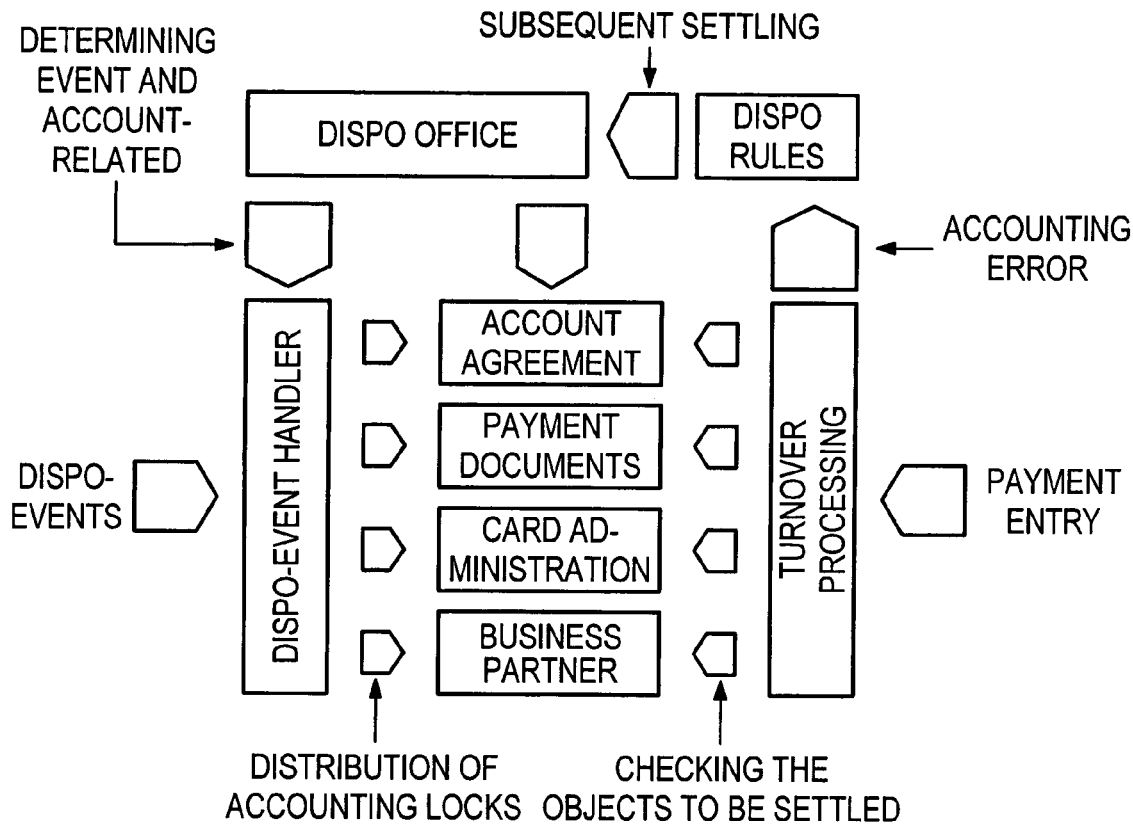
FIG. 3 is a block diagram showing the interplay between the components according to the invention within the turnover processing (where DispoOffice denotes Posting Control Office, DispoRules denotes Posting Control Rules, DispoEvents denotes Posting Control Events or Posting Locks and DispoEvent Handler denotes Posting Lock Manager).
Figure 4:
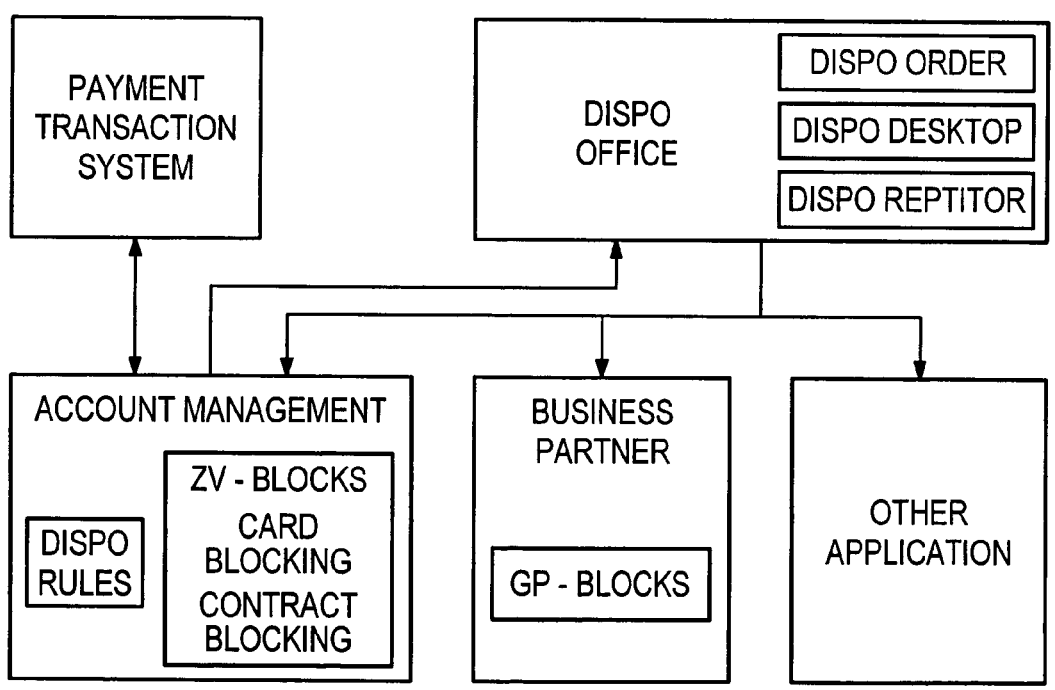
FIG. 4 is a block diagram showing the structure of the Posting Lock Office according to the invention.

FIG. 3 shows a block diagram to illustrate the interplay within the turnover processing with the participation of the so called Posting Lock Manager and FIG. 4 is a block diagram illustrating the structure of the so called Posting Control Office.

The Posting Lock Manager accepts posting control locks from various input channels (back office, call centre or switching systems and credit reference agencies) and determines the reaction of the system, according to the rules. The solution runs largely without any manual intervention in operation (receipt and processing of events). In account management, possible manifestations of blocking processes are contract blocking (the contract as a whole and the blocking of partial functions), the blocking of cards in the portfolio as well as cheques and other printed payment means. At the business partner the central business partner lock can be imposed, extending across all the accounts held by the customer.

If for example a business partner notifies an arrangement, the Posting Lock Manager distributes suitable barriers. Thus, this rule may for example prevent overdrawing and debits on all accounts and may block all the cards for the business partner in question. This regulating mechanism can be extended in customer-specific manner.

As a result of the primary function of account management, of managing the legal position, flexible reporting is available. This includes numerous lists such as for example lists of overdrawings, balances and transactions. It is also possible to draw up lists for blocked accounts and cheques and reconciled balance lists for comparing the payment transaction balances.

The definition of other reports is flexibly possible.

Accessory applications to account management from the point of view of the application landscape are:

Posting Control Office
Dynamic limit setting
Warnings/interest on overdrafts

As mentioned hereinbefore, accessory applications add to or support the function or task of one or more core applications.

The Posting Control Office is an additional application to account management which serves to provide payment entries in which a lock or unauthorised overdrawing has been detected in the accounting.

Payment entries which come up against booking obstacles (locks) in account management and accounts in which there is an unauthorised overdraft are disposed of according to a regulating mechanism (posting control rules). This regulating mechanism which can be adjusted in client specific manner is administered in account management. If desired, information on payment entries which are not explicitly rejected in response to the posting control rules are diverted to the Posting Control Office by means of a disposal order (Posting Control Order), where they are further processed (settled) either mechanically or manually. Mechanical settlement (repetitor) comprises automatic resubmission of payment entries for accounting to account management. Payment entries for which there are only temporary booking obstacles (e.g. limit problems) can be settled without any manual intervention by means of the repetitor.

The duration and frequency of resubmission and the final reaction (e.g. rejection) in the case of unresolved or fresh obstacles to booking can be adjusted.

The manual processing of payment entries which are to be settled is carried out at the posting control desktop. In this partial solution the role-based set up and usability are of central importance. The disposing manager is assisted in his decision by access to data relevant to the decision, either to finally deal with the payment entry (book or reject actions etc) or pass them on for mechanical settlement.

Dynamic limit setting is a solution which is required particularly in automated mass business. This is an accessory application to account management which allows the individual bank to set automatic limits for the customer on the basis of defined rules and input parameters.

Dynamic limit setting is programmed by the customer or in customer projects to suit individual requirements. The limit setting communicates with the stock control, the business partner and the operational CRM.

This accessory application is responsible for out-of-court warning processes.

Figure 5:
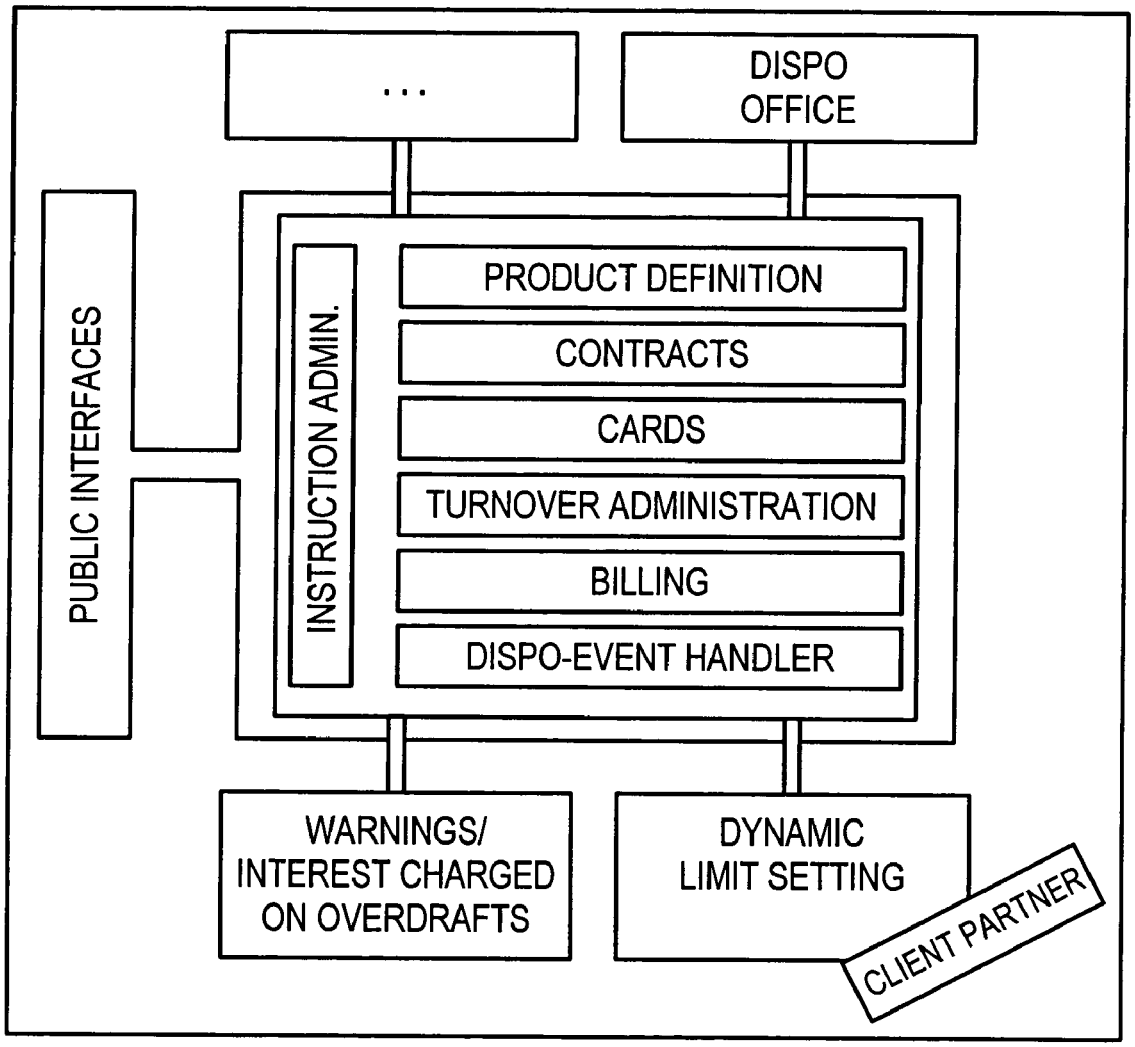
FIG. 5 is a block diagram showing an overview of the structure of the core application account management.

FIG. 5 is a block diagram providing a summarising overview of the structure of the core application account management.

Figure 6:
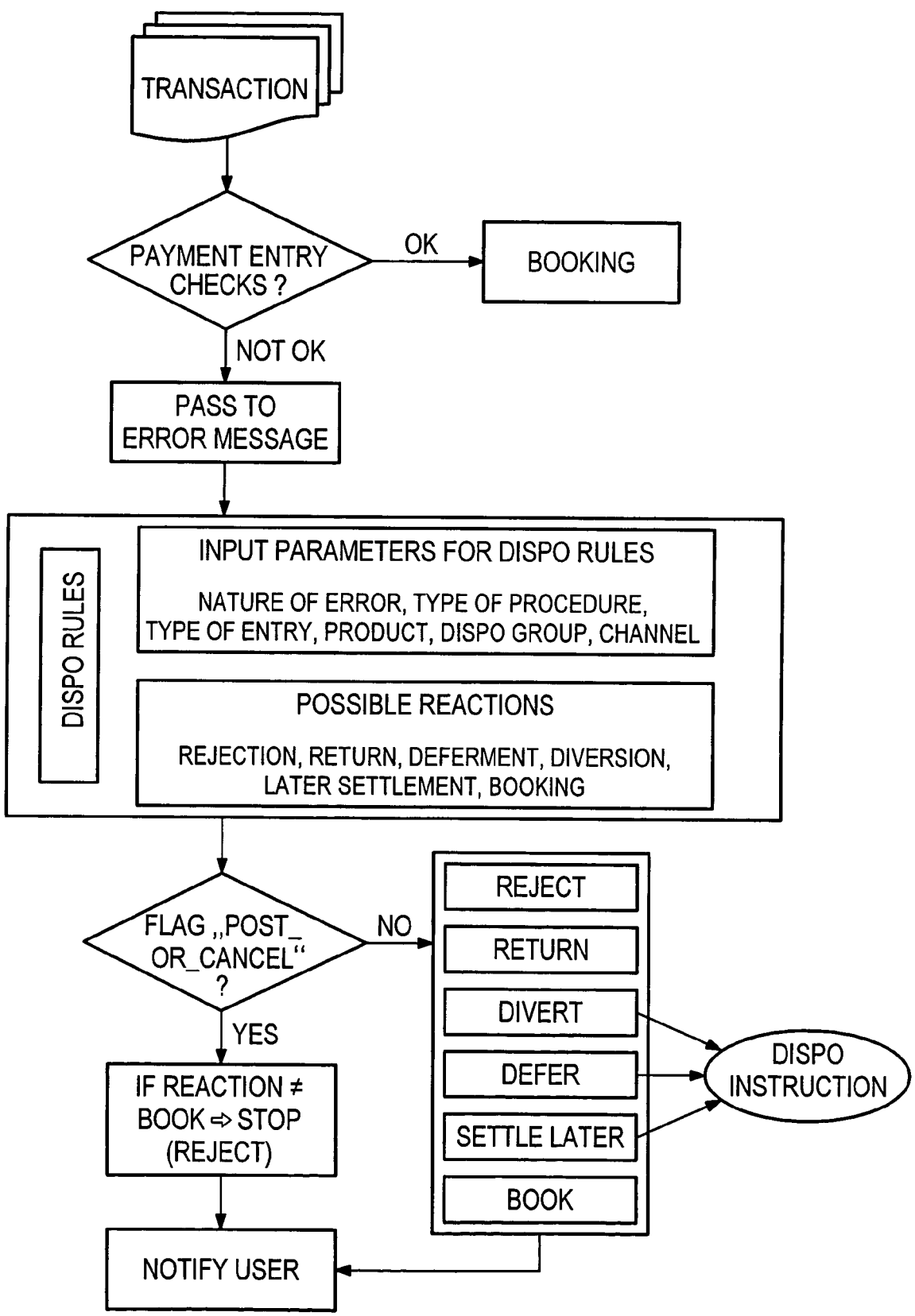
FIG. 6 diagrammatically shows, by means of a flow diagram, the running logic according to the invention within the turnover processing.
Figure 7:
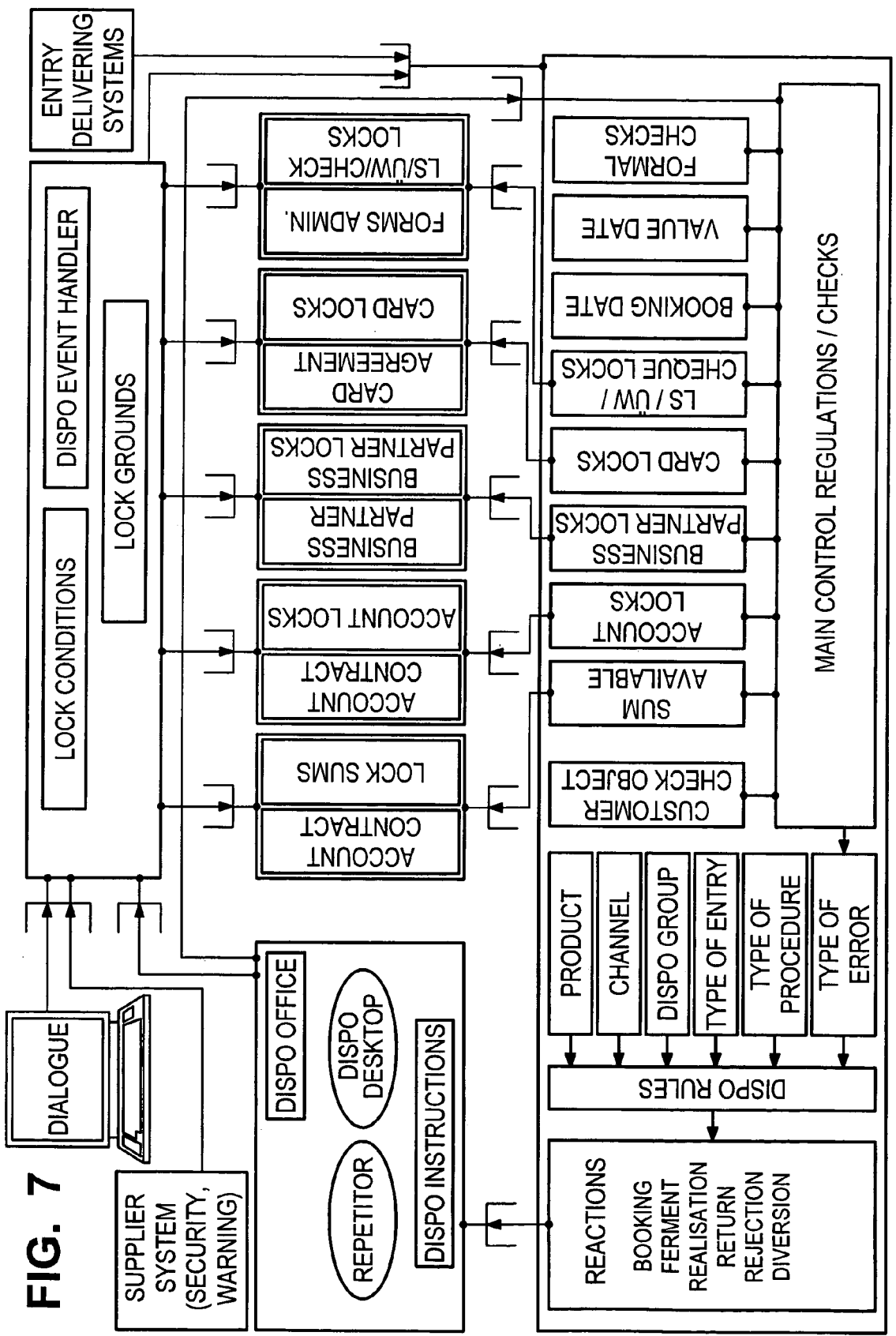
FIG. 7 is a block diagram showing the tying in of rules of arrangement into a locking landscape according to the invention.

FIG. 6 diagrammatically shows a running logic within the turnover processing of payment entries with rules governing the arrangement.

The following reactions are possible according to the invention within the regulatory mechanism for material disposition:

1. Booking

The entry is booked in the account, updating all the objects concerned. No posting control instruction is set up.

2. Finishing

The entry is "appended" to the account; the transaction figures on the account are not updated. A posting control instruction is set up for the Posting Control Office.

3. Subsequent Disposition

The entry is booked in the account, updating all associated objects. A posting control instruction is set up for the Posting Control Office.

4. Rejection

This reaction is provided for originator entries. The entry is not accepted by the turnover processing and is sent back to the caller. A report is provided indicating the test object by which transfer to account management AM has failed. No posting control application is set up.

5. Return

This reaction is only used for receiver entries. The reaction initiates automatic return. For this automatic return it is essential to establish which ground for return is used. The ground for the return determines whether the return is visible or invisible, for example, i.e. whether it shows up in the customers bank statement or not.

Example:

A customer gives consent for his liability insurance contributions to be deducted by direct debit. At the time when the debit is paid the account is blocked to prevent further debits. The debit is automatically cancelled. In this case a record must be made in the customers account so that he is informed of the non payment of his premium.

A customer stops a cheque. The cheque is suppose to be charged to the customers account. It is to be returned automatically. The bank has established that the customer will see nothing of this charge. The booking and automatic return are carried out without showing up on the bank statement. No correspondence with the customer is initiated.

6. Diversion

The entry is not booked into the original target account but is diverted by the regulatory mechanism. The account in question is supplied through a separate accounting route which will be described in the following chapter. If the diversion takes place into a CpD account a posting control instruction for the Posting Control Office is set up.

For some business events it is necessary to make the booking not in the account of origin of the entry but to divert the payment entry into internal accounts. This can be done mechanically by means of the posting control rules. If a diversion is to be made into an account, an account must be deposited where the reaction "diversion" is recorded.

Within the posting control rules, an account symbol is put in for the above mentioned accounts against the reaction "diversion". This account symbol is replaced by a real account number in a subsequent step. This procedure has the following advantages:

It simplifies the changing of an account by changing at a central point of customising.

There is no need to change the posting control rules.

Transparency of the influencing factors in finding the account.

The defined account symbol is differentiated with the aid of the following fields:

Country of bank and bank sort code

Currency

Thus, diverting accounts can be defined depending on the currency and "organisation unit" of the payment entry which is to be diverted. Only those postings whose transaction currency corresponds to the currency of the account and which correspond to the combination of bank country and bank code deposited in the customising are booked to a specified diversion account.

Example:

The following entry is recorded within the posting control rules.

| Type of error | Type of procedure | Reaction | Account symbol |
|---|---|---|---|
| Blocked card | Guaranteed payment | Diversion | Adjustment |

The account symbol "adjustment" is replaced by the following entries:

⇒Adjustment Branch 1, DEM Account 4711
⇒Adjustment Branch 2, DEM Account 4712
⇒Adjustment *, DEM Account 4713
⇒Adjustment *, EUR Account 0815

If an account symbol is shown against the reaction "diversion" diversion automatically takes place into the account specified. The original receiver data (Account No, bank sort code, country of bank) are kept on the payment entry.

If an account symbol is marked against the reactions "finishing" or "subsequent disposition" the account specified is passed on to the downstream Posting Control Office for information purposes.

Grounds for the reaction

At present (Status TRBK Giro 2) grounds for the reactions "return" and "rejection" can be defined in customising on the basis of business management requirements. With the reaction "return" the assignment of the field controls the attributes for carrying out the return (see the specification "return"). For the reaction "rejection" the grounds are reported back to the ZVS where they can be evaluated. Grounds for the reaction may be deposited in the rule entries for the primary and follow up reactions. Entries regarding the follow up reactions are passed on to the Posting Control Office for final processing.

If a downstream Posting Control Office were able to re-book the transferred entry into a processing account, an account symbol for the proposed account is deposited here.

The reaction for a downstream Posting Control Office is deposited here if the number of re-submissions or the deadline has expired. A so called follow up reaction in the regulating entry is only sensible if the preliminary reactions "diversion" (into a CpD account) or finishing has been set up. In these cases a posting control instruction is set up and the follow up reaction initiated can be carried out in the Posting Control Office by the repetitor. Grounds must be stated in the regulating entry for the follow up reactions of "rejection" and "return".

Treatment of Formal Errors

If, within the processing of an entry, a formal error or system error occurs, this overrides the rules on material disposition. The processing of the entry is stopped and the reason for the error is sought.

This does not relate to all the errors which may be detected within the course of formal checking. The following results of formal checking do not generally lead to a rejection of the payment entry by the account management, but can be dealt with in the posting control rules by submitting regulating entries:

Checking the date of booking: for errors arising from this check evaluation may be carried out using the posting control rules.

Checking for the presence or status of the account in the AM: in the case of originator entries, errors arising from this check lead to rejection of the payment entry. Receiver and turnover entries, however, can be diverted to CpD accounts by means of the posting control rules if the CpD processing takes place in the AM and therefore the CpD account location is deposited in customising.

Determining the Rules which Apply

The rules which apply are determined using the following plan:

Generally speaking a fully qualified access takes priority over unqualified access.

Generalisation (dequalification) of the code takes place in the following sequence:

7. Channel
8. Posting Control Group
9. Product
10. Group of procedures
11. Type of entry
12. Type of error This means that first of all access is obtained with a fully qualified code. If a corresponding entry is found here, this is the one which applies.

If not, access is obtained without the field channel. If an entry is found here, this is the valid one.

If not, access is obtained without the errors channel and posting control group (Dispo group). If an entry is found here, this is the valid one, etc.

Example: In the posting control rules it should read:

| No. | Nature of error | Dispogroup | Reaction |
|---|---|---|---|
| 1. | Exceeding limit | Everyday account | Return visible |
| 2. | Exceeding limit | * | Subsequent arrangement |

This arrangement ensures that automatic return takes place only with everyday accounts.

The proper reaction, in the case of a number of rules applying, is determined as follows:

From each object, one or more different error messages (or types of errors) can be determined, with the result that a number of rules can be found using the algorithm described above. The appropriate reaction is determined by prioritising the reactions found. In this case:

Rejection takes priority
  Return takes priority
    Diversion takes priority
      Finishing takes priority
        Subsequent disposal takes priority over booking If no errors are found in the objects during a booking and there is no entry in the regulating mechanism, the posting is booked.

At least all the data known only during the turnover processing are provided. The interface with the Posting Control Office (where data are accepted and stored) is described in the specification "Posting Control Office".

All error messages obtained during the turnover processing are sent to a downstream Posting Control Office for information purposes by means of a finalising instruction (posting control instruction). The same applies to error messages transmitted by the system which is to be used through interfaces.

References to the Turnover Generated

Within the processing of the turnover, as before, entries are generated with the various status features. In addition, a finalising instruction is generated which is intended to initiate further processing of the transactions/account.

So that the finalising instruction can refer to the entry produced, the following fields have to be provided:
 System
 Client
 The system to be used (in this case account management AM/possible other systems: payment transaction system)
 Identification of the payment entry
 Position of the payment entry The reaction obtained by the rules on procedure has to be submitted to the Posting Control Office as this will decide the methods of processing.
 Example:
 The reaction "deferment" (entries not booked yet) requires study of the entry in most cases
 The reaction "later settlement" (entry already booked) requires further study of the entry and/or account Feedback The feedback to the preliminary system should take place for each entry at the following level:
 Rejected (grounds based on the test objects)
 Booked Later settlement (grounds based on the test objects) Necessary as confirmation of execution is required for certain target-end bookings (EDIFACT/FINPAY)
 Deferment (grounds based on the test objects) Here, the following example was provided illustrating the need for feedback. A longstanding instruction is cancelled if the error "no cover" appears for three months. This is not true of other blocks.
 Return (grounds based on the test objects)
 Diverted (grounds based on the test objects)
 In addition there are the formal errors of "account does not exist" and "technical error" to be included in the feedback The reactions of the posting control rules can be associated with return codes as follows:

| Reaction Posting Control Rules | Return Code Generated |
|---|---|
| Booking | Booked |
| Later settlement | Booked (target end only) |
| Deferment | Deferment |
| Rejected | Rejected |
| Return | Return |

With automatic checking of booking, thus, according to the invention, when the error "posting control rules" occurs, these rules apply, automatically triggering preset (customer-specific) consequences.

Checks on bookings according to the invention check all the test entries (unlike the prior art where the test routine is abandoned as soon as the first error is found), and all the errors are collected. This makes it possible to weight all the errors found within the scope of a booking test with regard to the relevance of the individual errors.

If automatic processing is not possible, as may be the case for example with a name check arising from a discrepancy in names provided, the procedure is passed on to the Posting Control Office module. The Posting Control Office is a user-friendly monitor screen workstation the screen layout of which depends on the error detected. Thus, for example, with the name check mentioned above a selection of possible correct names is indicated directed and automatically. Previously, the correction of an error which could not be remedied in an automatic procedure had to be done completely manually on the basis of an on-screen display of the account details, with the employee responsible for the case independently collecting the information needed to put right the error that had occurred.

The distribution of the instructions in the Posting Control Office is carried out according to preset criteria depending on the qualification and requirements of the check. When the screen is opened a check is made to see whether the fault is still there, i.e. whether for example covering funds have now been provided. This is ensured by the so-called Posting Control Repetitor checking erroneous bookings daily over a given period of time. For this purpose there is a setting determining which kind of errors (e.g. overdrawn accounts) are checked repeatedly over the predetermined period if there is a certain probability that the fault will be only temporary (i.e. if sufficient funds will be available again on the first of the month, for example). An operator dealing with the process on screen may optionally refer the process manually to the Posting Control Repetitor.

In addition, locks or barriers may be imposed according to the invention which have an effect on checking the bookings, such as for example the stopping of cheques, a deterioration in credit rating, the blocking of credit cards. The system allows automatic monitoring of dates for time-limiting locks, such as for example a block on a cheque or credit card which is to be removed after 12 months.

There is also a link between the lock administration and Posting Control Office so that clarification can be obtained within the scope of automatic checking to see why a lock has been imposed. Reasons for locks can be called up directly from the so-called Posting Lock Manager (preferably by selecting the card tab on-screen).

In addition it is possible to carry out modification-free expansion by means of customer-specific locking objects, and automatic checking is carried out by an additional "checker" which feeds the results into the system according to the invention. This allows an attachment order, for example, to be deposited centrally.

What is claimed is:

1. A computer-implemented method for processing a payment entry from a customer to a third party, comprising:
 automatically checking, by the computer, the payment entry for errors as the payment entry is received;
 upon detecting one or more errors with the payment entry, assigning, by the computer, a weight to each of the one or more errors; and initiating, by the computer, appropriate follow-up measures depending on the weight assigned to the one or more errors, the appropriate follow-up measures including:
rejecting the payment entry,
returning notice of the error to an account associated with the customer when the payment entry has been rejected,
diverting the payment entry to a posting control system to process the payment,
finishing the payment by appending the payment to the account associated with the customer, without updating objects within the account associated with the customer and issuing posting instructions to the posting control system,
initiating a subsequent disposition of the payment by booking the entry into the account associated with the customer, and sending posting control instruction for posting the payment to the account of the customer to the posting control system, and
booking the payment entry to the account associated with the customer.

2. The method according to claim 1, wherein the initiated follow-up measures are carried out automatically.

3. The method according to claim 1, wherein an operator is presented with a display based on the weight assigned to the one or more errors, the display including data needed to process a given error.

4. The method according to claim 1, wherein the payment entry is automatically postponed for a given length of time if an error has occurred and is re-examined after the length of time has elapsed.

5. A apparatus for processing a payment entry from a customer to a third party, comprising:
a processor directed to:
automatically check the payment entry for errors as the payment entry is received;
upon detecting all of the errors with the payment entry, assign a weight to each of the errors;
initiate appropriate follow-up measures depending on the weight assigned to each of the errors; and
process the payment entry according to the initiated follow-up measure, the appropriate follow-up measures including:
rejecting the payment entry,
returning notice of the error to an account associated with the customer when the payment entry has been rejected,
diverting the payment entry to a posting control system to process the payment,
finishing the payment by appending the payment to the account associated with the customer, without updating objects within the account associated with the customer and issuing posting instructions to the posting control system,
initiating a subsequent disposition of the payment by booking the entry into the account associated with the customer, and sending posting control instruction for posting the payment to the account of the customer to the posting control system, and
booking the payment entry to the account associated with the customer.

6. The apparatus according to claim 5, wherein the initiated follow-up measures are carried out automatically.

7. The apparatus according to claim 5, wherein an operator is presented with a display based on the weight assigned to each of the errors, the display including data needed to process a given error.

8. The apparatus according to claim 5, wherein the payment entry is automatically postponed for a given length of time if an error has occurred and is re-examined after the length of time has elapsed.

9. A computer-implemented method for processing an erroneous payment entry from a customer to a third party by a computer system, comprising:
storing, by the computer, data related to a customer account in a memory system;
generating, by the computer, a set of posting control rules for the customer account based on the stored data;
receiving, by the computer, a payment entry, wherein the payment entry is submitted by a customer whose account data has been stored in the memory system;
identifying, by the computer, all errors in the payment entry;
in response to the identified errors, accessing, by the computer, the stored data and generated set of posting control rules for the customer submitting the payment entry; and
executing, by the computer, a reaction to the payment entry based on the stored data, the generated set of posting control rules and the identified errors, the reaction including:
rejecting the payment entry,
returning notice of the error to an account associated with the customer when the payment entry has been rejected,
diverting the payment entry to a posting control system to process the payment,
finishing the payment by appending the payment to the account associated with the customer, without updating objects within the account associated with the customer and issuing posting instructions to the posting control system,
initiating a subsequent disposition of the payment by booking the entry into the account associated with the customer, and sending posting control instruction for posting the payment to the account of the customer to the posting control system, and
booking the payment entry to the account associated with the customer.

10. The computer-implemented method of claim 9, the storing comprises:
inputting a customer identification, a type of financial product related to the customer account, a customer role, customer instructions regarding customer accounts, and customer agreements.

11. A computer-implemented method for processing a payment, comprising:
receiving, by thee computer, information corresponding to a payment from a customer to a third party and entering the received payment information in a database stored in a memory system;
associating, by the computer, the entered payment information with an account corresponding to the customer;
automatically checking, by the computer, the associated payment information for errors;
upon detecting one or more errors with the payment information, assigning, by the computer, a weight to each of the one or more errors; and
initiating appropriate follow-up measures depending on the weight assigned to the one or more errors, the appropriate follow-up measures including:

rejecting the payment entry, returning notice of the error to an account associated with the customer when the payment entry has been rejected, diverting the payment entry to a posting control system to process the payment, finishing the payment by appending the payment to the account associated with the customer, without updating objects within the account associated with the customer and issuing posting instructions to the posting control system, initiating a subsequent disposition of the payment by booking the entry into the account associated with the customer, and sending posting control instruction for posting the payment to the account of the customer to the posting control system, and booking the payment entry to the account associated with the customer.

12. The computer-implemented method according to claim 11, wherein the payment from the customer to the third party was made via a credit card, a check or an automatic debit from the account corresponding to the customer.

13. The computer-implemented method according to claim 11, wherein the follow-up measure includes informing the customer that a scheduled automatic debit from the account corresponding to the customer was blocked.

14. The computer-implemented method according to claim 11, wherein the follow-up measure includes placing a lock on the account corresponding to the customer.

* * * * *

UNITED STATES PATENT AND TRADEMARK OFFICE
CERTIFICATE OF CORRECTION

PATENT NO. : 7,636,874 B2 Page 1 of 1
APPLICATION NO. : 10/846570
DATED : December 22, 2009
INVENTOR(S) : Gutbrod et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1041 days.

Signed and Sealed this

Ninth Day of November, 2010

David J. Kappos
*Director of the United States Patent and Trademark Office*